Oct. 1, 1968
J. T. FRANCIS
3,403,922
GOLF CART
Filed May 10, 1966
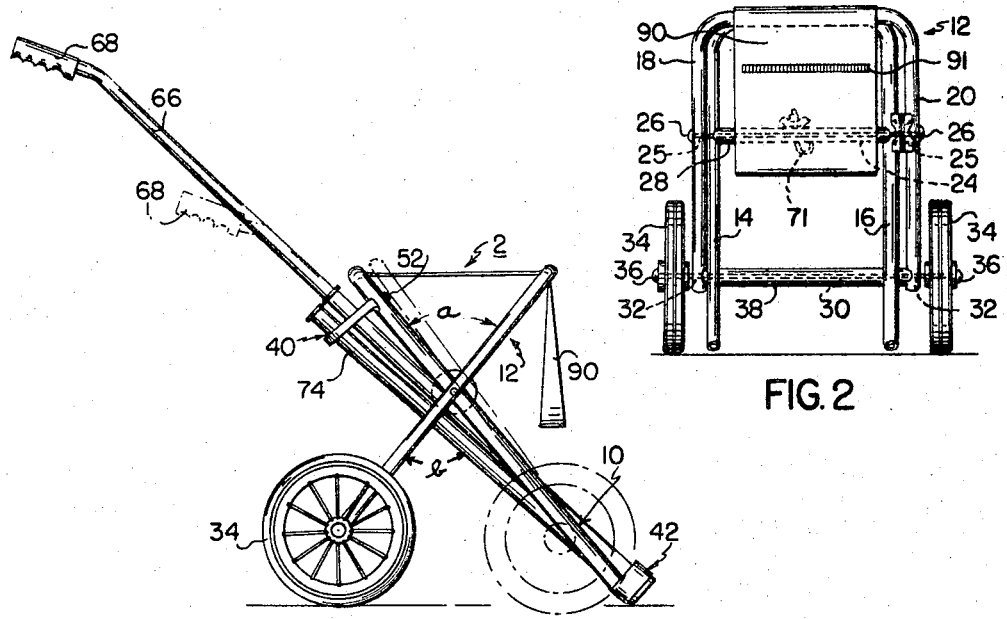
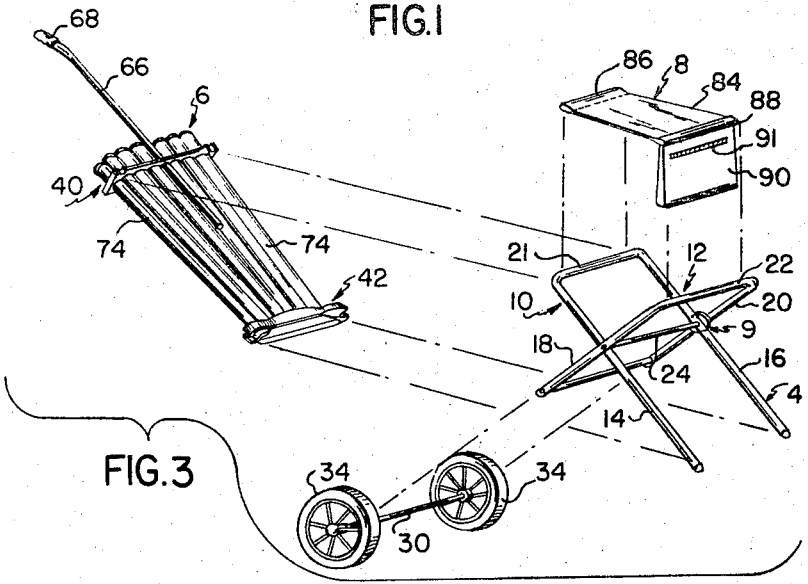
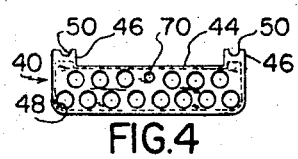
FIG.4
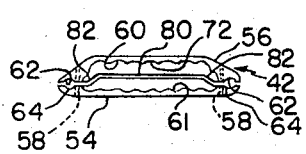
FIG.5
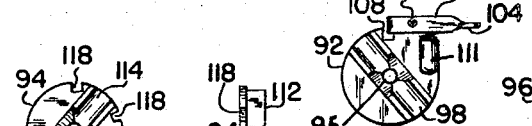
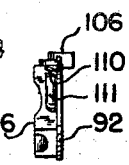
INVENTOR
JAMES T. FRANCIS
BY
Teare, Teare & Sammon
ATTORNEYS

United States Patent Office 3,403,922
Patented Oct. 1, 1968

1

3,403,922
GOLF CART
James T. Francis, 325 Bathgate Road,
North Madison, Ohio 44057
Filed May 10, 1966, Ser. No. 549,010
4 Claims. (Cl. 280—41)

ABSTRACT OF THE DISCLOSURE

A collapsible golf cart comprising, a pair of U-shaped frame members physically connected to one another so as to enable one member to collapse upon the other member. A golf club supporting member is mounted on one of the frames and includes tube members adapted to receive golf clubs therein. A ground engaging member is disposed adjacent the lower end of one frame member, and wheel members are disposed adjacent the lower end of the other frame member. A flexible support member extends between the upper ends of the frame members, and is supported thereby to provide a seat for the user.

---

This invention relates to golf equipment, and more particularly relates to an improved golf cart construction for carrying golf equipment, such as golf clubs, balls and other similar equipment, employed in the game of golf.

The recent and rapid increase in the popularity for the game of golf has brought forth various types of wheeled carts for transporting the necessary equipment during play. One such type usually comprises a foldable frame to which a separate golf bag may be attached for rolling movement with the cart along the ground. Such cart types have several apparent, though not all inclusive, disadvantages including: added expense due to the requirement to have a separate bag and cart; the requirement to remove and separately store the bag and/or cart; the unstability of the cart during use, particularly on irregular contours; and the inability to provide an economic and efficient rest or seat for the golfer which may be conveniently usable and without the need for auxiliary parts and/or equipment. Other more recent types have included what may be termed "self-contained" units which generally comprise a foldable frame having as an integral part thereof, a compartmentalized carrier for receiving the individual golf clubs. It has been found, however, that serious difficulties are encountered with the use of such units. Units of this type have been made wherein the wheels are foldable toward and away from the frame for storage purposes, but wherein in the folded position, the wheels are not available for moving the cart, particularly around the ever crowded pro-shops. One cart of this type has been made to incorporate a seat with the cart having a three-point contact with the ground. In this arrangement, however, the seat has been more or less cantilevered rearwardly from the frame which has resulted in a highly unstable, if not dangerous, support due to the tendency for the cart to tilt and/or roll out from under the occupant.

Accordingly, it is an object of the present invention to overcome the aforementioned and other related disadvantages of heretofore known carts by the provision of an improved golf cart construction which is simple, light weight and economical to construct; which provides a

2 rattle-proof and scratch-proof protection for the equipment, such as the golf clubs; which is of a strong, durable construction with a minimum of moving parts; which may be readily adjustable to accommodate clubs of various lengths while maintaining precise finger-tip balance for rolling the cart along the ground; which incorporates a foldable seat and that has generally three-point engagement with the ground to insure uniform weight distribution and increased stability in the erected position; which provides ready accessibility to the seat from three sides of the cart; which may be quickly and easily folded into a compact position for storage purposes, but which may be rolled about in the folded position; which incorporates a novel latch means for holding the cart in the erected or folded position with a minimum of time and effort; and which incorporates means for holding auxiliary equipment, such as an umbrella, ball retriever, golf balls, clothing and the like.

Further objects and advantages of the present invention will be apparent to those skilled in the art as the description herein proceeds with reference to the accompanying drawings, in which like reference characters designate like parts throughout, and in which;

FIG. 1 is a side elevation view of the novel golf cart of the present invention shown in the erected position (solid line) and in the folded position (broken line) with the handle in an extended operative position (solid line) and in the retracted position (broken line);

FIG. 2 is an end view looking from the right hand side of FIG. 1 and with parts removed for purposes of clarity;

FIG. 3 is a generally perspective assembly view showing in general the component parts of the golf cart;

FIG. 4 is an enlarged top plan view of one of the upper support members removed from the assembly;

FIG. 5 is an enlarged top plan view of the lower support member removed from the assembly;

FIG. 6 is an enlarged front view of one of the components of the novel latch mechanism made in accordance with the invention;

FIG. 7 is an end view of the component looking from the right hand side of FIG. 6;

FIG. 8 is an enlarged front view of the other component of the novel latch mechanism;

FIG. 9 is an end view of the component looking from the right hand side of FIG. 8; and FIG. 10 is a side elevation view showing the components of FIGS. 6 to 9 in the assembled position.

Referring then again to the drawings and in particular to FIGS. 1 to 3 thereof, the novel golf cart of the invention, designated generally at 2, is shown in erected position (solid line FIG. 1) for rolling coaction along the ground. The cart 2, in the embodiment shown, generally comprises a wheeled support unit 4, a carrier unit 6, a rest or support unit 8 and a locking assembly 9 for retaining the cart in the erected or folded position (brokenline FIG. 1) for compact storage thereof.

The wheeled support unit 4 preferably comprises a pair of inverted, generally U-shaped frame members 10 and 12 each of which includes a pair of oppositely disposed legs 14, 16 and 18, 20 respectively, which may be connected together adjacent one end by cross-members 21 and 22. The legs 18 and 20 of the frame member 12 are preferably foreshortened relative to the legs 14 and 16 of the frame member 10 so as to accommodate wheels thereon for rolling engagement along the ground. Moreover, the maximum transverse distance between the legs 18 and 20 of the frame member 12 is preferably slightly greater than the corresponding maximum transverse distance between the legs 14 and 16 of the frame member 10 so that the same member 10 can be disposed within the boundary defined by the same member 12, thereby to provide ready pivotal movement of the frame member 12 with respect to the frame member 10.

To provide for such pivotal movement the respective frame members 10 and 12 may be connected together slightly above their mid-portions by a shaft 24 which extends transversely thereof and through registered apertures, as at 25, provided in the associated legs 14, 16, 18 and 20 and secured thereto by suitable fasteners 26, such as cap nuts or the like. An elongated, hollow tube 28 (FIG. 2) may be disposed over the shaft 24 so as to extend transversely thereof and into abutting engagement with the legs 14 and 16 of the frame member 10. By this arrangement, the frame member 12 can be quickly and easily pivoted through a generally vertical plane relative to the frame member 10 so that in the erected position (solid line, FIG. 1) the cart assumes a generally X-shaped construction to provide a maximum support therefor; and while in the folded position (broken-line, FIG. 1), the frame member 12 is disposed in generally parallel alignment with the frame member 10 for compact storage thereof.

For rolling the cart along the ground, an axle 30 may be provided to extend transversely adjacent the lower ends of the legs 18 and 20 of the frame member 12 and through aligned apertures as at 32, provided therein. A pair of low-profile wheels 34 may be rotatably mounted adjacent the opposed distal ends of the axle 30 and secured thereon by suitable fasteners 36, such as cap nuts or the like. An elongated, hollow tube 38 (FIG. 2) may be disposed over the axle 30 so as to extend transversely thereof and into abutting engagement with the legs 18 and 20 of the frame member 12, thereby to protect the axle and associated parts during use thereof.

The carrier unit 6 preferably comprises an upper support member 40 and a lower support member or base 42. The upper support member 40 may be of a generally U-shaped configuration (top plan) having a body 44 and a pair of spaced, oppositely disposed lugs 46 extending outwardly adjacent the opposed ends of the body 44. The body 44 may include a plurality, such as fourteen, of holes 48 extending therethrough and disposed in two parallel, laterally spaced rows of six and eight, respectively so as to slidably, yet snugly receive therethrough a corresponding number of tubing elements. The lugs 46 preferably include generally arcuate flanges 50 which may project outwardly therefrom for receiving thereon the associated legs 14 and 16 of the frame member 10. The legs 14 and 16 may be detachably secured thereto by suitable fasteners 52, such as the bolt shown in FIG. 1.

The lower support or base 42 may be of a two-part construction including a lower section 54 and an upper section 56 which may be detachably connected together by suitable fasteners, 58, such as screw or the like. The sections 54 and 56 may each be provided with a plurality of generally arcuate grooves 60 and 61 corresponding in number to the number of holes 48 provided in the upper support member 40 so as to slidably, yet snugly receive a plurality of tubing elements therein. The opposed distal ends of the respective sections 54 and 56 may be provided with generally arcuate under-cut grooves 62 and 64 so as to engageably clamp therebetween the legs 14 and 16 of the frame member 10 upon tightening of the fasteners 58, as aforesaid.

To facilitate pulling movement of the cart along the ground, a handle 66 having a hand grip portion 68 adjacent one end may be disposed for telescopic coacting engagement through a hole 70 provided in the upper support member 40 and clamped therein by a suitable fastener 71, such as a J-bolt or the like (FIG. 2). In the completely retracted position, the handle 66 is adapted to be slidably inserted downwardly and into abutting engagement against the bottom portions of the respective sections 54 and 56 of the lower support member 42 to prevent further axial movement thereof. The section 54 of the lower support member 42 may be provided with a generally arcuate groove 72 (FIG. 5) which serves to accommodate the lower distal end of the handle 66 in the completely retracted position thereof.

To readily transport a plurality of golf clubs, such as woods and irons, a plurality of elongated, tubing elements 74 comprised of a polymeric material, such as polyethylene or the like, may be slidably, yet snugly inserted through the associated holes 48 provided in the upper support member 40 and into engagement against the bottom portions of the respective sections 54 and 56 of the lower support member 42, so as to be held in abutting engagement intermediate the associated grooves 60 and 61 provided therein. As best seen in FIG. 5, the respective sections 54 and 56 of the lower support member 42 are preferably joined together along a parting line 80 which may have off-set tapered portions, as at 82, to prevent axial shifting movement of the sections relative to one another in the assembled position thereof, thereby to reduce the stress and strain forces on the fasteners which join the parts together.

The seat or support unit 8 comprises a flexible support member 84 which may be looped, as at 86 and 88, adjacent its opposed ends around the cross-members 21 and 22 of the respective frame members 10 and 12. By this arrangement, the member 84 provides a generally horizontally extending support, in the erected position of the cart, which bridges the respective frame members 10 and 12 to accommodate thereon an occupant, such as a golfer, during breaks or lulls in play. The support member 84 is preferably comprised of a reinforced polymeric material, such as a vinyl coated nylon cloth or the like. By this arrangement, the support member 84 may be easily stored in the folded position of the cart while providing maximum support for an occupant in the erected position of the cart.

To readily accommodate and transport auxiliary golf equipment, a carrier bag 90 may be made integral with the support member 84 or separate therefrom, such as being looped around the cross-piece 22 of the frame member 12, thereby to depend downwardly therefrom adjacent the rear of the cart. The carrier bag 90 is of a hollow construction and may be of a generally polygonal, such as triangular shape, in side elevation (FIG. 1) so as to provide a maximum area for storage. The carrier bag 90 is also preferably comprised of a reinforced polymeric material, such as vinyl coated nylon cloth or the like, to provide maximum strength and weather resistant characteristics. To provide ready ingress and egress to the carrier bag 90 a zipper 91 may be provided adjacent the upper end of the bag as best seen in FIG. 2.

The locking assembly 9 for holding the frame members 10 and 12 in the erected or folded position preferably comprises a pair of annular plates 92 (FIGS. 6 and 7) and 94 (FIGS. 8 and 9) detachably connected together (FIG. 10) for rotational movement inserting the same between frames 10 and 12 with the shaft 24 disposed through aligned holes 95 and 99 provided in the plates 92 and 94, respectively. The plate 92 may include an integral web 96 having a generally U-shaped channel 98 adapted to receive the leg 20 of frame member 12. An arm 100 may be pivotally mounted adjacent one end of the plate 92, as at 102, and includes an actuating portion 104 adjacent one end and a bent locking portion 106 (FIG. 7) adjacent the other end adapted for engageably coacting within a radial slot 108 provided in the outer peripheral edge of the plate 92. The arm 100 may be resiliently biased by means of a coiled spring 110 disposed within a sleeve 111 made integral with the plate 92 so that the spring 110 bears at one end against the bottom of the sleeve 111 and at the other end against the arm 100 to normally hold the bent portion 106 into biased engagement with the slot 108.

The other plate 94 includes a similar integral web 112 having a U-shaped channel 114 adapted to receive the leg 16 of the frame 10. In this form, however, the plate 94 has a pair of radial slots 118 provided adjacent its outer peripheral edge. The slots 118 are preferably angularly disposed and circumferentially spaced so as to correspond to the included angle (a) defined between the respective frame members 10 and 12 in the erected position thereof, as shown in FIG. 1. This included angle may preferably be about 80°.

In operation, and with reference to the erected position of FIG. 1, the bent portion 106 of the arm 100 is normally held in biased engagement within the slot 108 of the plate 92 and in registration with one of the slots 118 in the plate 94 so as to provide the aforementioned included angle (a) between the frame members 10 and 12, whereby the wheels 34 are disposed in ground engaging position forwardly of the pivotal connection between the frame members 10 and 12, while the lower support or base 42 is disposed in ground engaging position rearwardly of the pivotal connection to provide a substantially three point support for the cart. In the erected position, it can be seen that the tubing elements 74 of the carrier unit 8 are somewhat off-set or underslung with respect to the frame member 10 adjacent one end by reason of the depending construction of the upper support member 40 so that the included angle (b) between the general plane of the tubing elements 74 and the other frame member 12 is slightly greater than the included angle (a) between the frame members 10 and 12. Preferably, the included angle (b) may be about 87°. By this arrangement, the center of gravity of the cart is substantially lowered and is adapted to be disposed substantially over the axle 30 of the wheels 34 during rolling of the cart along the ground. This arrangement not only facilitates rolling of the cart, but provides an effective finger-tip balance for turning the cart, particularly on irregular contours.

To fold the cart, the arm 100 is simply actuated against the biasing force of the spring 110, whereupon, the frame member 12 may be pivoted forwardly (counterclockwise) until the bent portion 106 of the arm 100, due to relative rotation between the plates 92 and 94, is disposed in the slot 108 of the plate 92, but now also in registration with one of the other slots 118 in the plate 94 and held therein by the biasing force of the spring 110. In this folded position, the frame members 10 and 12 are disposed in a substantially parallel alignment with the wheels 34 disposed rearwardly for grounding engagement in close proximity to the lower support member or base 42, thereby to be readily available for moving the cart in its folded position. To erect the cart, the foregoing operations are simply reversed.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A collapsible golf cart for use in carrying golf equipment and for supporting a user having improved stability and movability characteristics comprising, a first generally U-shaped frame member defined by a pair of spaced, generally parallel legs connected together at one end by a cross-member, a second generally U-shaped frame member defined by a pair of spaced, generally parallel legs connected together at one end by a cross-member, a transversely extending shaft connecting the adjacent legs of the respective frame members together between their ends for pivotal movement of said first frame member in a vertical plane relative to said second frame member, an axle extending transversely between the free ends of said legs of said first frame member and a pair of wheels rotatably mounted adjacent the opposed ends of said axle for rolling movement of the cart along the ground, the lengthwise dimension of the legs of said second frame member being greater than that of the legs of said first frame member with a first support member extending transversely between the distal ends of said longer legs adapted for engagement with the ground, a flexible fabric-like seat member attached to and extending generally horizontally between said cross-members in the erected position of said cart and adapted to be folded upon itself in the collapsed position of said cart, a second support member attached to and extending transversely between the legs of said second frame member adjacent the end remote from said first support member, an elongated carrier unit supported in underslung relation between said first and second support members so that the second frame member and said carrier unit extend divergently away from one another in a direction away from said first support member, said carrier unit including a plurality of elongated, hollow tubes mounted at one end on said first support member and received at their other end through apertures in said second support member adapted for receiving golf clubs therein, said tubes extending generally parallel to one another and defining the divergent relation of the carrier unit with respect to said second frame member, an elongated handle mounted on said carrier unit, said handle disposed in the general plane defined by said tubes and extending outwardly beyond said tubes in the direction of forward movement of said cart, in the collapsed position of said cart, said first frame member being disposed in generally parallel alignment with the said second frame member and said carrier unit and with said wheels being disposed in close proximity to said first support member and accessible for rolling engagement with the ground; in the erected position of said cart, said first frame member being pivoted in a clockwise direction away from said second frame member to define a generally X-shaped configuration therewith so that said flexible seat member is extended horizontally in centered relation above said shaft with said wheels disposed in grounding position forwardly of said shaft and said first support member disposed in ground engaging position rearwardly of said shaft so that the included angle between the said first frame member and said carrier unit below said shaft is greater than the included angle between said first and second frame members above said shaft, whereby the general center of gravity of said cart is disposed approximately over said axle upon minimum angular displacement of said handle in a direction toward said wheels, and locking means disposed in co-acting relation between adjacent legs of said frame members to hold the same in said collapsed and erected position upon actuation thereof.

2. A collapsible golf cart in accordance with claim 1, wherein said locking means includes a pair of oppositely disposed annular plates connected together for rotation relative to one another, said plates being disposed in co-acting engagement between a leg of said first frame member and an adjacent leg of said second frame member, each leg including a recessed channel formed on its outer side for receiving one of the adjacent of said legs therein, one of said plates pivotally mounting a locking arm and a resilient spring element co-acting between said plate and said arm to bias one end of said arm into a slot provided on the outer periphery of said plate, the other of said plates including a pair of angularly disposed slots opening on to the periphery thereof adapted to receive the end of said arm upon pivotal actuation thereof for selectively locking said plates in rotationally registered position with respect to one another.

3. A collapsible golf cart in accordance with claim 2, wherein the pair of slots in said one plate are disposed at an angle with respect to one another which corresponds to the included angle between said first and second frame members when in the erected position of said cart.

4. A collapsible golf cart in accordance with claim 1, including a hollow carrier bag depending downwardly in free swinging relation from the cross-member of said second frame member, said carrier bag having a closable opening to provide ingress and egress to the interior of said bag for storing auxiliary golf equipment therein.

References Cited

UNITED STATES PATENTS

| | | | |
|---|---|---|---|
| 510,355 | 12/1893 | Mann | 280—41 |
| 2,438,078 | 3/1948 | Sutphen | 280—36 |
| 2,902,287 | 9/1959 | Elias | 280—38 |
| 3,014,760 | 12/1961 | Gard | 297—192 |
| 3,165,330 | 1/1965 | Cotton | 280—41 |

BENJAMIN HERSH, *Primary Examiner.*

J. SIEGEL, *Assistant Examiner.*